(12) United States Patent
Krishnan et al.

(10) Patent No.: US 11,906,770 B2
(45) Date of Patent: Feb. 20, 2024

(54) MONOLITHIC OPTICAL RETARDER

(71) Applicant: KLA Corporation, Milpitas, CA (US)

(72) Inventors: Shankar Krishnan, Santa Clara, CA (US); David Y. Wang, Santa Clara, CA (US)

(73) Assignee: KLA Corporal, Mi lpitas, CA (US)

( * ) Notice: Subject to any disclaimer, the term of this patent is extended or adjusted under 35 U.S.C. 154(b) by 26 days.

(21) Appl. No.: 17/541,037

(22) Filed: Dec. 2, 2021

(65) Prior Publication Data
US 2023/0131913 A1   Apr. 27, 2023

Related U.S. Application Data

(60) Provisional application No. 63/270,058, filed on Oct. 21, 2021.

(51) Int. Cl.
| | |
|---|---|
| *G02B 5/30* | (2006.01) |
| *G02B 5/04* | (2006.01) |
| *G01J 3/02* | (2006.01) |
| *G01J 3/14* | (2006.01) |
| *G02B 17/04* | (2006.01) |

(52) U.S. Cl.
CPC .......... *G02B 5/3091* (2013.01); *G01J 3/0224* (2013.01); *G01J 3/14* (2013.01); *G02B 5/04* (2013.01); *G02B 17/04* (2013.01)

(58) Field of Classification Search
CPC ........ G02B 5/3091; G02B 5/04; G02B 17/04; G01J 3/0224; G01J 3/14
USPC ....................................................... 356/327
See application file for complete search history.

(56) References Cited

U.S. PATENT DOCUMENTS

| | | | |
|---|---|---|---|
| 5,013,380 | A | 5/1991 | Aoshima |
| 5,608,526 | A | 3/1997 | Piwonka-Corle et al. |
| 5,859,424 | A | 1/1999 | Norton et al. |
| 6,115,401 | A | 9/2000 | Scobey et al. |
| 6,429,943 | B1 | 8/2002 | Opsal et al. |
| 6,641,662 | B2 | 11/2003 | Radojevic et al. |

(Continued)

FOREIGN PATENT DOCUMENTS

| | | |
|---|---|---|
| CN | 103424881 A | 12/2013 |
| WO | WO-2020153843 A1 * | 7/2020 |

OTHER PUBLICATIONS

Ball, David W., "Dispersing Prisms", Spectroscopy, Sep. 1, 2008, vol. 23, Issue 9, 18 pages.

(Continued)

*Primary Examiner* — Md M Rahman
(74) *Attorney, Agent, or Firm* — Suiter Swantz pc llo

(57) ABSTRACT

A monolithic optical retarder formed from a monolithic prism may include an input face for receiving a light beam, an output face aligned with an optical axis of the light beam prior to entering the input face, and three or more reflection faces. The three or more reflection faces may be oriented to provide an optical path for the light beam from the input face to the output face via reflection by the three or more reflection faces, where the monolithic optical retarder imparts a selected optical retardation on the light beam based on total internal reflection on at least one of the reflection faces. Further, the input face, the output face, and the three or more reflection faces may be oriented such that an optical axis of the light beam exiting the output face is equal to the optical axis of the light beam entering the input face.

38 Claims, 9 Drawing Sheets

(56) References Cited

U.S. PATENT DOCUMENTS

| | | |
|---|---|---|
| 6,690,514 B2 | 2/2004 | Davydov |
| 7,315,381 B2 | 1/2008 | Sesko et al. |
| 7,478,019 B2 | 1/2009 | Zangooie et al. |
| 7,633,625 B1 | 12/2009 | Woollam et al. |
| 7,933,026 B2 | 4/2011 | Opsal et al. |
| 8,085,644 B2 | 12/2011 | Sharp |
| 9,291,554 B2 | 3/2016 | Kuznetsov et al. |
| 9,568,652 B1 | 2/2017 | Fry |
| 9,664,909 B1 | 5/2017 | Whiteside et al. |
| 9,843,153 B2 | 12/2017 | Schall et al. |
| 9,904,173 B2 | 2/2018 | Shmarev et al. |
| 9,915,522 B1 | 3/2018 | Jiang et al. |
| 10,474,041 B1* | 11/2019 | Zhao .................. G03F 7/70641 |
| 2004/0189964 A1* | 9/2004 | Nijmeijer .............. G03F 9/7026 355/55 |
| 2005/0259270 A1 | 11/2005 | Pocha et al. |
| 2007/0109552 A1* | 5/2007 | Felix .................. G03F 7/70775 356/491 |
| 2009/0091758 A1 | 4/2009 | Johs et al. |
| 2014/0172394 A1 | 6/2014 | Kuznetsov et al. |
| 2015/0204664 A1 | 7/2015 | Bringoltz et al. |
| 2015/0323445 A1* | 11/2015 | Rakitzis .................. G01J 4/04 356/367 |
| 2016/0209755 A1 | 7/2016 | Shmarev et al. |
| 2017/0261669 A1 | 9/2017 | Jiang |

OTHER PUBLICATIONS

Zhao, Zhigang et al., "Monolithic LiF or MgF2 lens-window-prism device for coherent 10.7 eV beam source with 1 MHZ repetition rate", Chinese Optics Letters, col. 17(5), 051406(2019), May 10, 2019, 4 pages.

Korean Intellectual Property Office, International Search Report and Written Opinion for International Application No. PCT/US2022/047071, dated Feb. 20, 2023, 7 pages.

* cited by examiner

MONOLITHIC OPTICAL RETARDER

CROSS-REFERENCE TO RELATED APPLICATION

The present application claims the benefit under 35 U.S.C. § 119(e) of U.S. Provisional Application Ser. No. 63/270,058, filed Oct. 21, 2021, entitled MONOLITHIC OPTICS FOR BROADBAND SPECTROSCOPY, which is incorporated herein by reference in the entirety.

TECHNICAL FIELD

The present disclosure relates generally to optical retarders and, more particular, to monolithic optical retarders.

BACKGROUND

Optical retarders such as waveplates are widely used in many applications including ellipsometry and reflectometry. Further, broadband applications such as, but not limited to, spectroscopic ellipsometry or spectroscopic reflectometry may require broadband optical retarders. For example, it may be desirable to provide phase shifts of a quarter wavelength across a wide wavelength range. Existing broadband optical retarders are typically formed by two or more prisms bonded together. However, bonded prisms may suffer from various issues including, but not limited to, delamination and contamination of interfaces due to low-wavelength light interaction (e.g., interaction with deep ultraviolet (DUV) or vacuum ultraviolet (VUV) light), large beam deviations due to pyramidal effects from the multiple components, or mechanical rigidity that is limited by van der Waal's forces. There is therefore a need to develop systems and methods to cure the above deficiencies.

SUMMARY

A monolithic optical retarder is disclosed, in accordance with one or more illustrative embodiments of the present disclosure. In one illustrative embodiment, the monolithic optical retarder is formed from a monolithic prism. In another illustrative embodiment, the monolithic prism includes an input face for receiving a light beam, an output face aligned with an optical axis of the light beam prior to entering the input face, and three or more reflection faces. In another illustrative embodiment, the three or more reflection faces are oriented to provide an optical path for the light beam from the input face to the output face via reflection by the three or more reflection faces, where the monolithic optical retarder imparts a selected optical retardation on the light beam upon propagation along the optical path based on total internal reflection on at least one of the three or more reflection faces. In another illustrative embodiment, the input face, the output face, and the three or more reflection faces are oriented to provide that an optical axis of the light beam exiting the output face is equal to the optical axis of the light beam entering the input face. In this way, the light beam is undeviated by propagation along the optical path through the monolithic prism.

A metrology system is disclosed, in accordance with one or more illustrative embodiments of the present disclosure. In one illustrative embodiment, the system includes an illumination source to generate an illumination beam. In another illustrative embodiment, the system includes one or more illumination optics to direct the illumination beam to a sample. In another illustrative embodiment, the system includes a detector. In another illustrative embodiment, the system includes one or more collection optics to collect light from the sample as a collected beam and direct at least a portion of the collected beam to the detector as detected light. In another illustrative embodiment, the system includes one or more monolithic optical retarders associated with at least one of the one or more illumination optics or the one or more collection optics, where a particular monolithic optical retarder of the one or more monolithic optical retarders is formed from a monolithic prism. In another illustrative embodiment, the monolithic prism includes an input face for receiving a light beam, an output face aligned with an optical axis of the light beam prior to entering the input face, and three or more reflection faces. In another illustrative embodiment, the three or more reflection faces are oriented to provide an optical path for the light beam from the input face to the output face via reflection by the three or more reflection faces, where the monolithic optical retarder imparts a selected optical retardation on the light beam upon propagation along the optical path based on total internal reflection on at least one of the three or more reflection faces. In another illustrative embodiment, the input face, the output face, and the three or more reflection faces are oriented to provide that an optical axis of the light beam exiting the output face is equal to the optical axis of the light beam entering the input face. In this way, the light beam is undeviated by propagation along the optical path through the monolithic prism. In another illustrative embodiment, the system further includes a controller communicatively coupled to the detector, wherein the controller includes one or more processors configured to execute program instructions causing the one or more processors to generate one or more metrology measurements of the sample based on the detected light.

A method is disclosed, in accordance with one or more illustrative embodiments of the present disclosure. In one illustrative embodiment, the method includes generating an illumination beam. In another illustrative embodiment, the method includes directing the illumination beam to a sample. In another illustrative embodiment, the method includes collecting light from the sample in response to the illumination beam as a collected beam. In another illustrative embodiment, a polarization of at least the illumination beam or the collected beam is controlled by at least one monolithic optical retarder formed from a monolithic prism. In another illustrative embodiment, the monolithic prism includes an input face for receiving a light beam, an output face aligned with an optical axis of the light beam prior to entering the input face, and three or more reflection faces. In another illustrative embodiment, the three or more reflection faces are oriented to provide an optical path for the light beam from the input face to the output face via reflection by the three or more reflection faces, where the monolithic optical retarder imparts a selected optical retardation on the light beam upon propagation along the optical path based on total internal reflection on at least one of the three or more reflection faces. In another illustrative embodiment, the input face, the output face, and the three or more reflection faces are oriented to provide that an optical axis of the light beam exiting the output face is equal to the optical axis of the light beam entering the input face. In this way, the light beam is undeviated by propagation along the optical path through the monolithic prism. In another illustrative embodiment, the method further includes directing at least a portion of the collected beam to a detector as detected light. In another illustrative embodiment, the method further includes generating one or more metrology measurements of the sample based on the detected light.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which.

DETAILED DESCRIPTION

Figure 1:
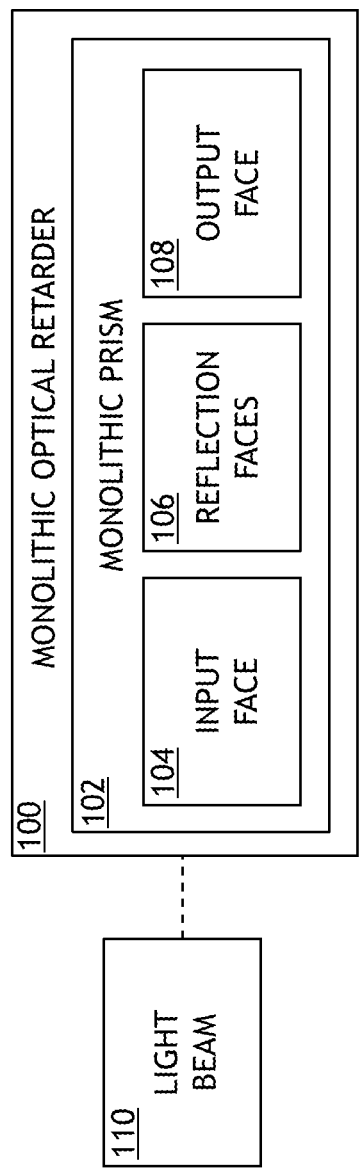
FIG. 1 is a conceptual block diagram of the components of a monolithic optical retarder, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to systems and methods for providing broadband (e.g., achromatic) optical retardation using a monolithic optical element without displacing an input beam. For the purposes of the present disclosure, the term monolithic is used to indicate an element fabricated from a single block of a single material without seams or interfaces between any constituent parts.

Optical retarders introduce an optical retardation (e.g., a phase retardation) corresponding to phase shift or phase delay between light with orthogonal polarizations, which typically has the effect of modifying a polarization state of the input light. For example, a quarter-wave optical retarder may introduce a phase shift of a quarter wavelength between orthogonal polarization components, which may have the effect of transforming linearly-polarized light to circularly-polarized light and vice versa. As another example, a half-wave optical retarder may introduce a phase shift of a quarter wavelength between orthogonal polarization components, which may have the effect of rotating linear polarized light by a selected angle.

It is desirable in many applications to provide broadband optical retardation without deviating the optical path of input light (e.g., introducing a deviation to the position or angle of an optical path of the input light). In particular, broadband optical retardation may provide equivalent optical retardation for multiple wavelengths, which may enable polarization modification of broadband input light or stable narrow-band polarization modification across a range of possible input wavelengths. Further, providing optical retardation with an undeviated optical path may allow the optical retarder to be inserted, removed, or rotated as necessary with minimal impact on the optical path of a beam in a larger system. However, it is contemplated herein that providing optical retardation with both an undeviated optical path and broadband capabilities remains a critical challenge, particularly for high-power beams or wavelengths extending into the ultraviolet (UV) spectral range and lower.

Optical retardation may be induced using various techniques such as, but not limited to, propagation through a birefringent material or total internal reflection. For example, waveplates typically utilize a birefringent material with a directionally-dependent refractive index to induce directionally-dependent phase delays on an input beam. Waveplates also do not deviate the optical path of the input beam when aligned at normal incidence. However, this technique is highly wavelength dependent and typically limited for narrowband applications since the refractive indices of the birefringent material vary as a function of wavelength. As another example, broadband optical retardation can be achieved using total internal reflection (TIR) from an internal surface of a prism. However, existing prism-based optical retarders such as Fresnel rhombs or k-prisms either deviate the input beam or require multiple prisms cemented together to achieve an undeviated optical path. The use of such cemented prisms may introduce various limitations for demanding applications including, but not limited to, potential delamination and contamination of interfaces when used with or exposed to ultraviolet (DUV) or vacuum ultraviolet (VUV) radiation, unacceptably large beam deviations due to pyramidal effects of the multiple components, or mechanical rigidity that is limited by van der Waal's forces.

Embodiments of the present disclosure are directed to a monolithic optical retarder formed from a monolithic prism providing broadband optical retardation and further providing an undeviated optical path for an exit beam with respect to an input beam. In some embodiments, the monolithic prism includes an input face to accept a light beam, an output face aligned with the input face, and three or more reflection faces. In particular, the input face, the output face, and the three or more reflection faces may be oriented to provide an optical path for the light beam from the input face to the output face via total internal reflection by the three or more reflection faces. Further, at least one of the reflection faces may be oriented to impart an optical retardation through total internal reflection (e.g., an incident angle is greater than a critical angle associated with TIR at a particular wavelength of the light beam). For the purposes of the present disclosure, a reflection face imparting an optical retardation on the light beam via TIR is referred to as a retardation face. In this way, a total optical retardation induced by the monolithic prism may correspond to cumulative optical retardations imparted by the retardation faces along the optical path through the monolithic prism.

In some embodiments, a monolithic optical retarder includes one or more non-retardation faces. For example, a non-retardation face may be oriented at an angle smaller than the critical angle associated with TIR and may thus reflect light without imparting an optical retardation. It is contemplated herein that a non-retardation face may be suitable for controlling an optical path of light through the monolithic prism (e.g., to ensure an undeviated optical path for an exit beam with respect to the input beam). Further, it is contemplated herein that a mix of retardation faces and non-retardation faces may allow substantial flexibility of the design of the monolithic prism while achieving both a selected optical retardation without deviating a light beam.

Further, any face including, but not limited to, a non-retardation face may include an optical coating to further modify or control the properties of the light beam. For example, a non-retarding face may include a coating to provide high reflectivity at an angle above the critical angle. For example, the coating may include, but is not limited to a metallic coating (e.g., a bare aluminum coating, or the like).

The monolithic optical retarder disclosed herein may have any number of retardation or non-retardation faces suitable for providing any selected optical retardation and an undeviated optical path for an exit beam with respect to an input beam. In some embodiments, the monolithic optical retarder is formed as a monolithic Fresnel k-prism. In some embodiments, the monolithic optical retarder is formed as a monolithic Fresnel rhomb.

It is contemplated herein that a monolithic optical retarder formed from a monolithic prism may provide numerous benefits over traditional prism designs including, but not limited to, high mechanical rigidity and an ability to transmit high fluences of UV/VUV/DUV light without any issues with delamination or interface degradation leading to scattering and/or loss of spectral fidelity. More generally, a monolithic optical retarder as disclosed herein may operate over a wide range of wavelengths including, but not limited to, 120-20,000 nm depending on the material used to form the monolithic prism.

Additional embodiments of the present disclosure are directed to systems and methods for metrology using at least one monolithic optical retarder as disclosed herein. In some embodiments, a metrology system including a monolithic optical retarder as disclosed herein includes, but is not limited to, an ellipsometer or a reflectometer.

Figure 2A:
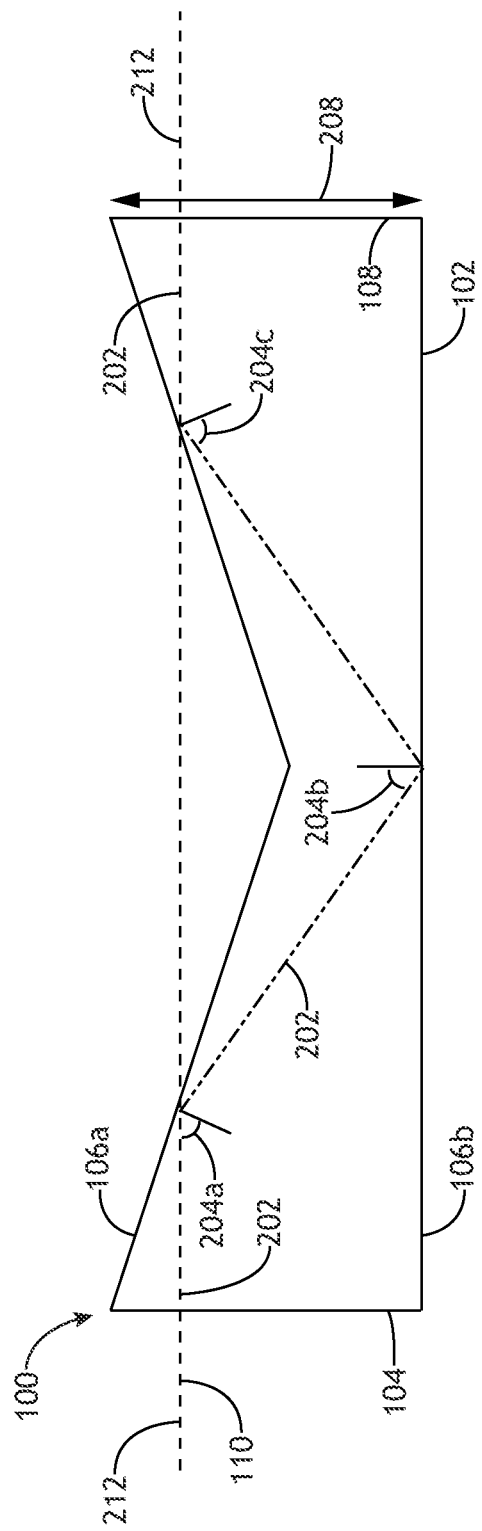
FIG. 2A is a schematic view of a monolithic optical retarder formed as a monolithic k-prism providing three reflection faces, in accordance with one or more embodiments of the present disclosure.
Figure 2B:
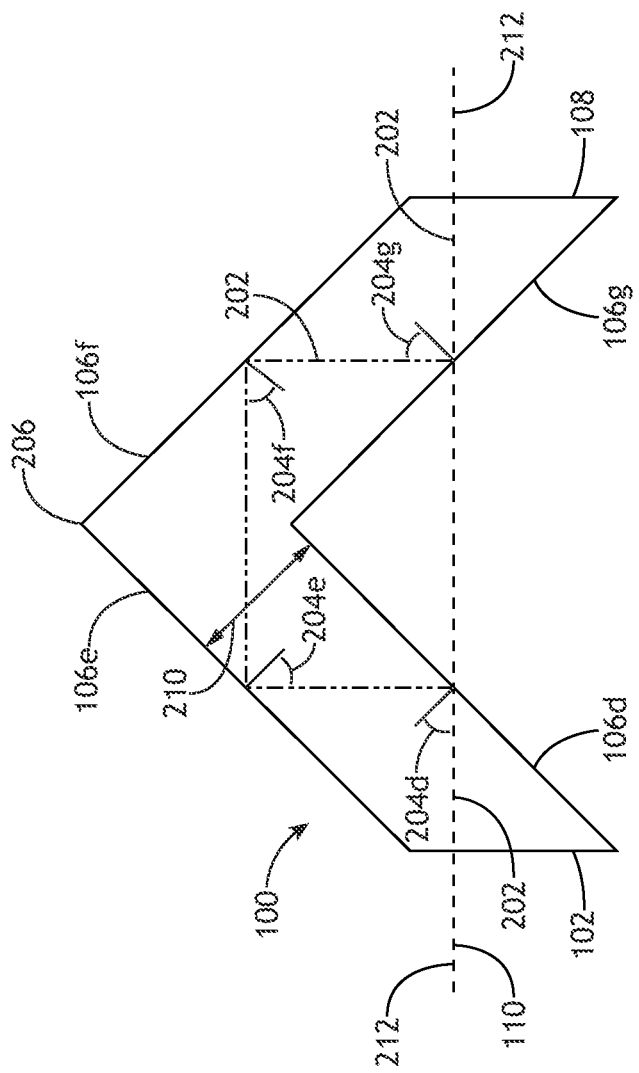
FIG. 2B is a schematic view of a monolithic optical retarder formed as a monolithic Fresnel rhomb providing four reflection faces, in accordance with one or more embodiments of the present disclosure.

Referring now to FIGS. 1-2B, a monolithic optical retarder is described in greater detail in accordance with one or more embodiments of the present disclosure.

It is recognized herein that light experiencing total internal reflection at an interface may also experience a phase shift at the interface. For all polarization directions, this phase shift ranges from 0 degrees at a critical angle at which TIR begins to 180 degrees at a 90-degree angle of incidence (here measured from normal though this is merely a matter of convention and is not limiting on the present disclosure). However, the phase shifts for p-polarized light (e.g., light with a polarization parallel to a plane of incidence) and s-polarized light (e.g., light with a polarization perpendicular to the plane of incidence) differ at intermediate angles, which gives rise to a phase difference between p- and s-polarized light (e.g., optical retardation) that depends on both the angle of incidence and the refractive index of the material in which the light is propagating. The precise phase difference may be characterized through the well-known Fresnel reflection coefficients.

As a result, an arbitrary optical retardation or relative phase difference between orthogonal p- and s-polarized portions of a light beam may be achieved through successive total internal reflections at selected angles. It is noted that the TIR-induced phase shift does depend slightly on the wavelength of the light as well since material refractive index varies with wavelength. However, this wavelength-dependent impact is relatively weak such that broadband performance may typically be achieved within acceptable tolerances for many applications. In contrast, optical retarders based on birefringence (e.g., waveplates) are typically highly-sensitive to wavelength and are typically limited to narrowband applications.

As described previously herein, it is contemplated that existing optical retardation devices based on TIR-induced phase shifts either deviate incident light which makes alignment and tuning within a larger system difficult or requires multi-component prisms cemented together which decreases mechanical stability and limits the power and/or wavelength range due to delamination or thermal issues.

Embodiments of the present disclosure are directed to monolithic optical retardation devices utilizing TIR-induced phase shifts.

FIG. 1 is a conceptual block diagram of the components of a monolithic optical retarder 100, in accordance with one or more embodiments of the present disclosure.

In some embodiments, a monolithic optical retarder 100 is formed as a monolithic prism 102 having an input face 104, multiple reflection faces 106, and an output face 108, where at least one of the reflection faces 106 operates as a redardation face that imparts an optical retardation to the light beam 110 through TIR (e.g., an incident angle of the light beam 110 on the retardation face along the optical path is greater than a critical angle for TIR). A light beam 110 may thus undergo optical retardation and associated polarization modification by entering the monolithic prism 102 through the input face 104, propagating along an optical path including reflection from the three or more reflection faces 106, and exiting the output face 108, where a total optical retardation imparted to the light beam 110 corresponds to cumulative optical retardations imparted by the retardation faces along the optical path.

A monolithic prism 102 may include any number of non-retardation faces along the optical path, where a non-retardation face corresponds to a reflection face 106 oriented such that an incident angle of the light beam 110 is lower than the critical angle for TIR and thus optical retardation is not imparted to the light beam 110. In this way, the reflective faces 106 along the optical path through a monolithic prism 102 may be divided into any combination of retardation and non-retardation faces including at least one retardation face.

The monolithic prism 102 may include an optical coating on any of the reflection faces 106 (e.g., an outer surface of any of the reflection faces 106). The coating may include any type of coating known in the art including, but not limited to, metallic or dielectric coatings and may. The coating may further have any number of layers. In some embodiments, the coating is a reflective coating such as, but not limited to, a metallic coating and may generally be operable on any wavelength or ranges of wavelengths of the light beam 110. For example, a metallic coating may include, but is not limited to, a bare aluminum coating.

As an illustration, it is recognized herein that an uncoated non-retardation face in which the light beam 110 has an incidence angle lower than the critical angle for TIR may typically transmit a first portion of the light beam 110 in addition to a second portion of the light beam 110 along the optical path. However, a coating on a non-retardation face may provide high reflectivity of the light beam 110 along the optical path and thus reduce or eliminate loss by the reflection at the non-retardation face.

The monolithic prism 102 may provide an undeviated optical path for the light beam 110 such that the monolithic prism 102 may be inserted, removed, and/or rotated (e.g., along an optical axis of the light beam 110) without impacting the position or angle of the light beam 110. For example, the input face 104 and the output face 108 may be aligned along an optical axis of the light beam 110 external to the monolithic prism 102. In this way, any modifications to the optical path of the light beam 110 are limited to locations within the monolithic prism 102. Further, in some embodiments, the output face 108 and the input face 104 are parallel, though it is to be understood that this is not a requirement.

The monolithic prism 102 may be formed as a solid, seamless, monolithic piece of any single material suitable for transmitting the light beam 110 such as, but not limited to, a glass or a crystal. For example, the monolithic prism 102 may be formed from materials such as, but not limited to, silica glass (e.g., UV-grade fused silica, BK7, or the like), fluoride glass (e.g., calcium fluoride ($CaF_2$), magnesium fluoride ($MgF_2$), or the like), zinc selenide, zinc sulfide, quartz, sapphire, or the like. In a general sense, it is recognized herein that different materials have different optical properties and transmission bands and may thus be suitable for different applications or wavelength ranges. As an illustration, UV-grade materials such as, but not limited to fused silica or sapphire may be suitable for, but not limited to, applications utilizing UV wavelengths. As another illustration, $CaF_2$ may provide, but is not limited to, operation in a wavelength range from 120-7000 nm or any combination of wavelengths therein. As another illustration, fused silica may provide, but is not limited to, operation in a wavelength range from 170-2500 nm or any combination of wavelengths therein. As another illustration, IR-transmissive materials such as, but not limited to, ZnS or ZnSe may be suitable for, but not limited to, applications utilizing IR wavelengths. However, it is to be understood that the monolithic prism 102 may generally be designed to operate for light beams 110 with any wavelength or range of wavelengths including, but not limited to, a range of 120 nm-20,000 nm.

Further, the monolithic prism 102 may be, but is not required to be, formed from an isotropic material providing a directionally-independent index of refraction. It is contemplated herein that an isotropic material with a directionally-independent index of refraction may provide optical retardation solely through TIR-induced phase shifts at the reflection faces 106, which may facilitate broadband performance. However, it is to be understood that this is not a requirement.

The monolithic prism 102 may include any number of reflection faces 106 arranged in any orientation to provide any desired amount of optical retardation between orthogonal polarization directions of the light beam 110. In particular, each reflection face 106 operating as a retardation face may be arranged to provide any selected phase shift based on the incidence angle of the light beam 110 and the index of refraction of the material forming monolithic prism 102. In this way, the monolithic prism 102 may provide a total phase shift based on the cumulative phase shifts introduced by each of the reflection faces 106, where the phase shifts of the various reflection faces 106 need not be the same. As an illustration, it is recognized herein that total phase shifts in the range of 60 degrees to 120 degrees are useful in many applications. Accordingly, in some embodiments, a monolithic prism 102 may include at least one reflection face 106 providing a phase shift in a range of 20-80 degrees. However, it is to be understood that the above illustration is non-limiting and any reflection face 106 generally provide any selected phase shift.

It is further contemplated herein that a relative phase shift between orthogonal polarization components of the light beam 110 (e.g., optical retardation) may generally have a modulus of 360 degrees (or $2\pi$ radians). In this way, the cumulative relative phase shifts from the reflection faces 106 of a monolithic prism 102 may exceed 360 degrees any number of times to provide any equivalent effective phase shift between 0 and 360 degrees. Additionally, it may be convenient to consider positive or negative relative phase shifts. For example, a phase shift between orthogonal polarization components of the light beam 110 may be considered to range from −180 degrees to +180 degrees. It is thus to be understood that the present disclosure or any provided examples is not limited to any particular convention for describing relative phase differences between orthogonal polarization components of the light beam 110.

Figure 3A:
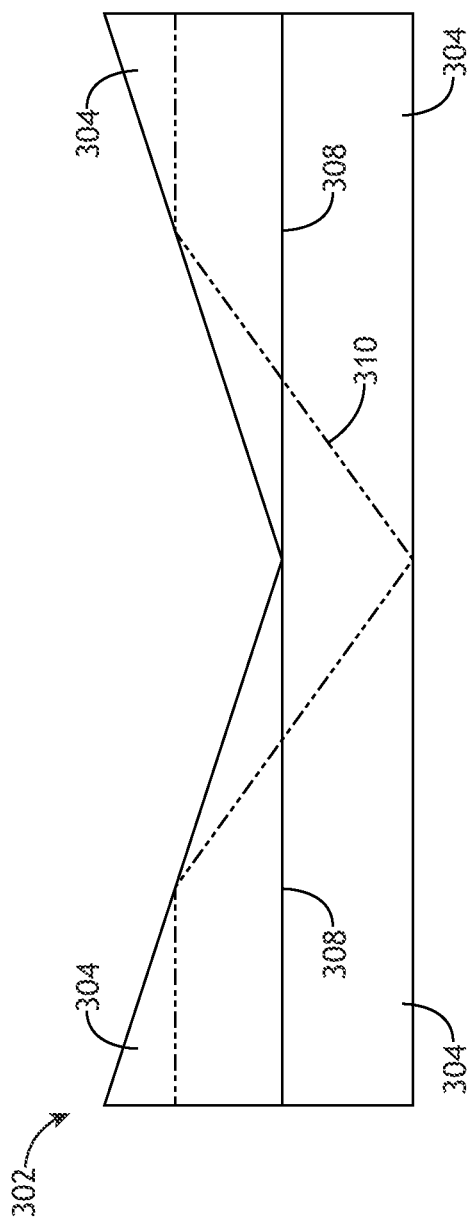
FIG. 3A is a schematic view of a conventional multi-component k-prism formed with three prism components, in accordance with one or more embodiments of the present disclosure.
Figure 3B:
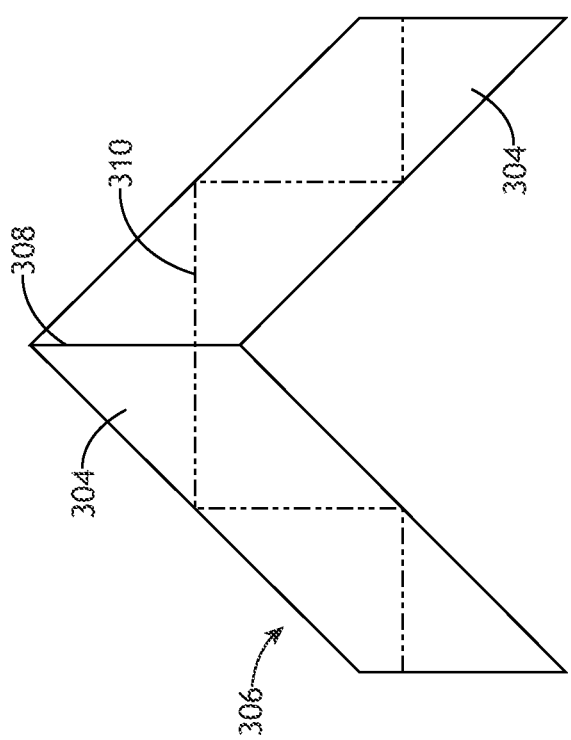
FIG. 3B is a schematic view of a conventional multi-component Fresnel rhomb providing two prism components, in accordance with one or more embodiments of the present disclosure.

FIGS. 2A and 2B illustrate two non-limiting examples of a monolithic optical retarder 100 formed from a monolithic prism 102 providing three and four reflection faces 106, respectively, in accordance with one or more embodiments of the present disclosure. FIGS. 3A and 3B illustrate contrasting multi-component prism designs.

FIG. 2A is a schematic view of a monolithic optical retarder 100 formed as a monolithic k-prism providing three reflection faces 106, in accordance with one or more embodiments of the present disclosure. For example, FIG. 2A illustrates an optical path 202 of a light beam 110 through the input face 104, reflecting from a first reflection face 106a with a first incidence angle 204a, reflecting from a second reflection face 106b with a second incidence angle 204b, reflecting from a third reflection face 106c with a third incidence angle 204c, and through the output face 108. In particular, FIG. 2A illustrates a configuration where the second reflection face 106b is orthogonal to both the input face 104 and the output face 108, and where the first reflection face 106a and the third reflection face 106c are symmetrically oriented such that the first incidence angle 204a and the third incidence angle 204c are equal.

FIG. 2B is a schematic view of a monolithic optical retarder 100 formed as a monolithic Fresnel rhomb providing four reflection faces 106, in accordance with one or more embodiments of the present disclosure. For example, FIG. 2B illustrates an optical path 202 of a light beam 110 through the input face 104, reflecting from a first reflection face 106d with a first incidence angle 204d, reflecting from a second reflection face 106e with a second incidence angle 204e, reflecting from a third reflection face 106f with a third incidence angle 204f, reflecting from a fourth reflection face 106g with a fourth incidence angle 204g, and through the output face 108. In particular, FIG. 2B illustrates a configuration where reflection faces 106d,e are parallel, reflection faces 106*f,g* are parallel, and reflection faces 106*f,g* are arranged to be reflection-symmetric about an apex 206 with respect to reflection faces 106*d,e*.

It is contemplated herein that the designs of a monolithic optical retarder 100 such as, but not limited to, those illustrated in FIGS. 2A and 2B may be adapted to provide a wide range of optical retardation values. In particular, the amount of TIR-induced optical retardation between orthogonal polarizations induced by any particular reflection face 106 depends on the incidence angle and the index of refraction of the monolithic prism 102 as described previously herein. The index of refraction may be adjusted through the choice of material used to fabricate the monolithic prism 102. The incidence angles on the various reflection faces 106 may be adjusted based on the physical dimensions of the monolithic prism 102. Considering the design illustrated in FIG. 2A as an example, the first incidence angle 204*a* and the third incidence angle 204*c* may be adjusted based on the angles of the first and third reflection faces 106*a,c* relative to the input face 104 and output face 108, whereas the second incidence angle 204*b* may be adjusted based on dimensions such as, but not limited to, lengths of the first and third reflection faces 106*a,c* or a prism height 208. Similarly, the incidence angles 204*d-g* in the design illustrated in FIG. 2B may be adjusted based a prism thickness 210 or on the angles and/or lengths of the reflection faces 106*d-g*.

Additionally, the reflection faces 106*a-c* in FIG. 2A or 106*d-g* in FIG. 2B may generally include any combination of retardation faces and non-retardation faces that includes at least one retardation face. For example, the non-limiting designs illustrated in FIGS. 2A and 2B may be adapted to provide incident angles both above a critical angle for TIR to provide TIR-based optical retardation or below the critical angle to provide reflection without optical retardation.

Further, the designs of a monolithic optical retarder 100 illustrated in FIGS. 2A and 2B provide a common plane of incidence for all reflection faces 106, which is the plane of the figure. As a result, further tuning of the incidence angles 204 may be achieved by rotating the monolithic prism 102 within the plane of the figure. However, it is to be understood that a monolithic optical retarder 100 as disclosed herein need not provide reflection faces 106 with a common plane of incidence. Rather, reflection faces 106 may generally be oriented in any suitable three-dimensional configuration.

The total optical retardation induced by the monolithic prism 102 may then be determined as the cumulative retardation induced by the various reflection faces 106 (e.g., the reflection faces 106 operating as retardation faces). Accordingly, any desired optical retardation between orthogonal polarizations may be induced based on the selection of the material, design, and physical dimensions of the monolithic prism 102. For example, a monolithic optical retarder 100 such as, but not limited to, those illustrated in FIGS. 2A and 2B may be adapted to provide a $\pi/2$ retardation to operate as a quarter-wave retarder, a $\pi$ retardation to operate as a half-wave retarder, or any other selected value. Further, it is to be understood that a monolithic optical retarder 100 may merely provide optical retardation between p- and s-polarized light at any particular reflection face 106, but the particular impact on a polarization state of the light beam 110 may depend on the input polarization of the light beam 110. For example, a monolithic optical retarder 100 providing $\pi/2$ retardation may convert linearly-polarized light to a circular polarization when oriented at particular angle (e.g., a 45-degree angle providing equal amounts of p- and s-polarized light at the reflection faces 106), but may produce elliptical polarizations for other input orientations.

Additionally, the designs of a monolithic optical retarder 100 illustrated in FIGS. 2A and 2B will not induce a deviation of an optical axis of the light beam 110 when the light beam 110 is aligned to enter the input face 104 at a normal incidence angle. As an illustration, the light beam 110 may follow a straight (e.g., undeviated) optical axis 212 extending to and from the monolithic prism 102 regardless of the optical path within the monolithic prism 102, where all deviations of the light beam 110 occur within the monolithic prism 102. In this way, the monolithic optical retarder 100 may be inserted, removed, and/or rotated (e.g., along the optical axis 212 of the light beam 110) without modifying the optical axis 212 of the light beam 110.

Referring now to FIGS. 3A and 3B, contrasting multi-component retarder designs are illustrated to further highlight the unique aspects of a monolithic optical retarder 100 as disclosed herein. FIG. 3A is a schematic view of conventional multi-component k-prism 302 formed with three prism components 304, in accordance with one or more embodiments of the present disclosure. FIG. 3A may then be considered a conventional multi-prism variation of the monolithic prism 102 illustrated in FIG. 2A. FIG. 3B is a schematic view of a conventional multi-component Fresnel rhomb 306 providing two prism components 304, in accordance with one or more embodiments of the present disclosure. It is recognized that in a general sense, conventional multi-component variations of FIGS. 3A and 3B may include any number of prism components 304 joined at any number of optical interfaces 308.

It is contemplated herein that a monolithic optical retarder 100 formed from a monolithic prism 102 may provide numerous benefits over traditional multi-component retarders including, but not limited to, high mechanical rigidity and an ability to transmit high fluences of UV/VUV/DUV light without any issues with delamination or interface degradation leading to scattering and/or loss of spectral fidelity.

For example, it is recognized herein that conventional multi-component retarders formed from cemented prism components 304 may require optically polished optical surfaces on each prism component at the optical interfaces 308 between the prism components 304. However, polishing compounds may be trapped in surface cracks, which may lead to hot spots at the interfaces due at least in part to differences between coefficients of thermal expansion (CTE) of the trapped polishing compounds and the substrate prism material. As a result, a monolithic optical retarder 100 that beneficially does not include any such optical interfaces 308 may provide superior high-power performance.

By way of another example, a monolithic optical retarder 100 as disclosed herein does not suffer from a risk of delamination. In contrast, the coefficient of thermal expansion (CTE) differences between trapped polishing compounds and the substrate prism material of conventional multi-component prisms may lead to delamination at the optical interfaces 308. Further, conventional multi-component prisms may generally have a limited temperature operational range due to delamination risks.

By way of another example, a monolithic optical retarder 100 as disclosed herein provides an uninterrupted optical path through the monolithic prism 102 and thus provides high beam uniformity with minimal to no scattering. In contrast, contact lines in a beam path of a conventional multi-component prism may be a source of scatter and spatial non uniformity.

By way of another example, a monolithic optical retarder 100 as disclosed herein provides minimal to no beam deviation and excellent parallelism due to the monolithic design. In general, axial beam deviation is associated with the geometrical tolerance stack up of the k-prism and cumulatively increases with increasing numbers of prism components 304.

By way of another example, a monolithic optical retarder 100 as disclosed herein provides high material uniformity throughout the monolithic prism 102, which facilitates high spatial (e.g., index) uniformity and high polarization uniformity. In general, it is easier to provide consistent spatial and polarization uniformity with a single substrate material than with multiple prism components 304 cemented together.

By way of another example, a monolithic optical retarder 100 as disclosed herein provides high mechanical rigidity, high thermal stability, high part-to-part hardware matching and generally promotes high manufacturing yield with a low cost of parts.

Figure 4A:
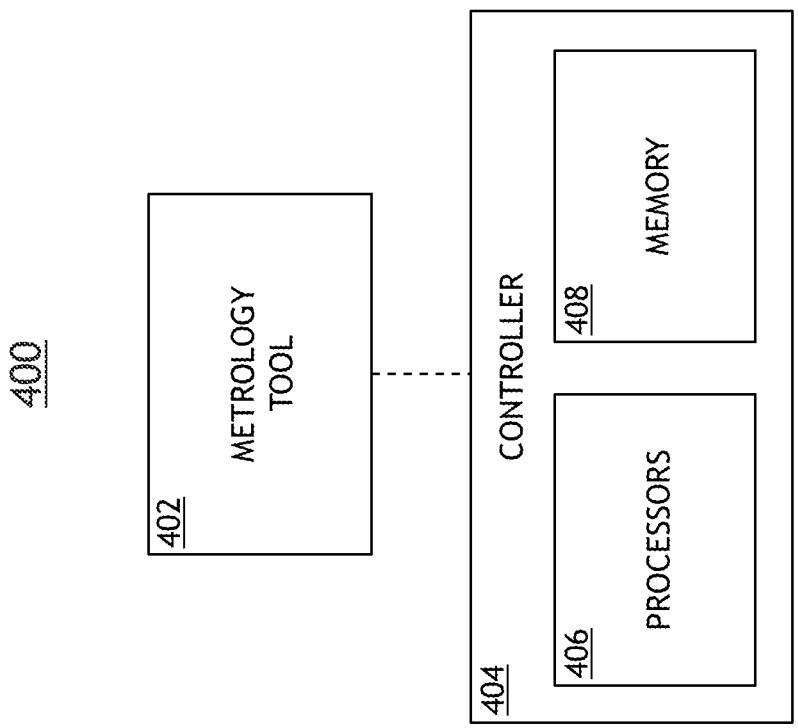
FIG. 4A is a block diagram view of a metrology system including a monolithic optical retarder, in accordance with one or more embodiments of the present disclosure.
Figure 4B:
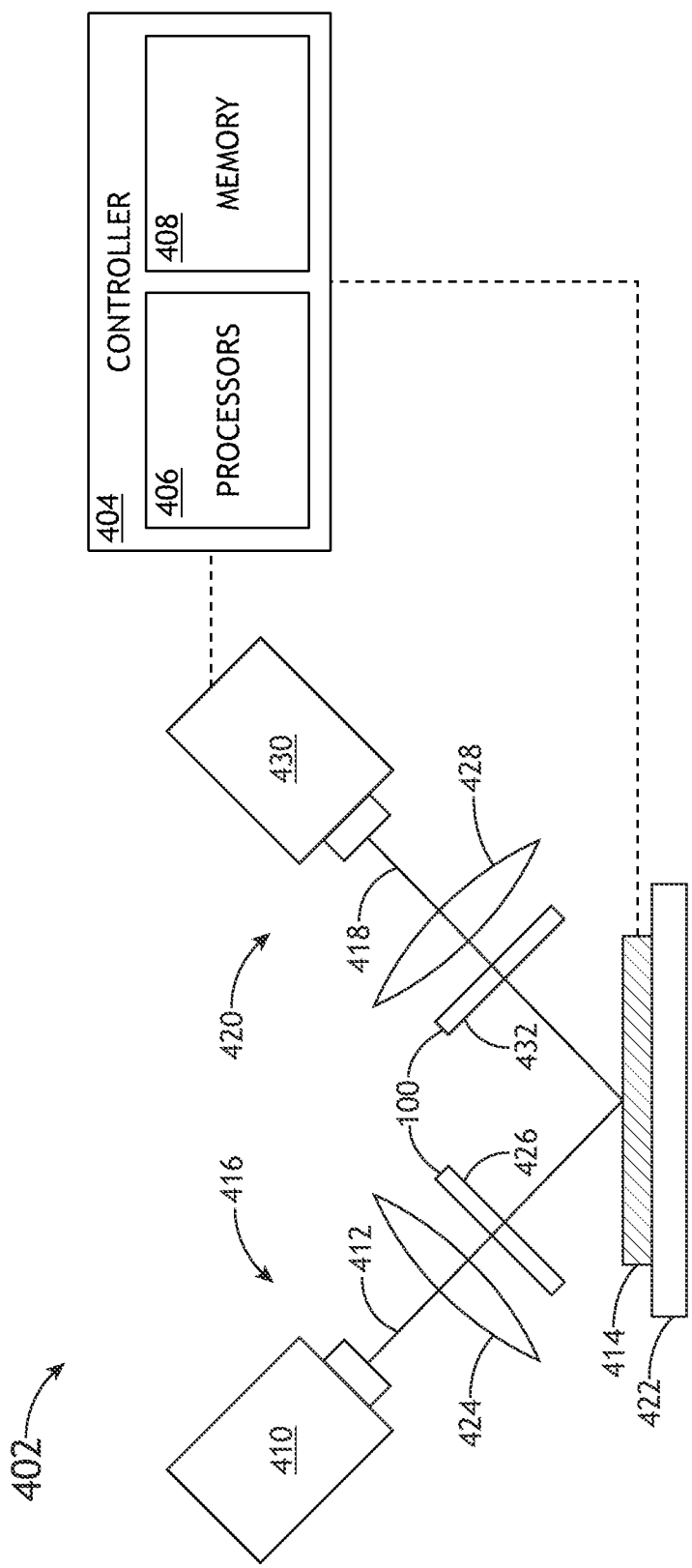
FIG. 4B is a conceptual view of a metrology tool, in accordance with one or more embodiments of the present disclosure.
Figure 4C:
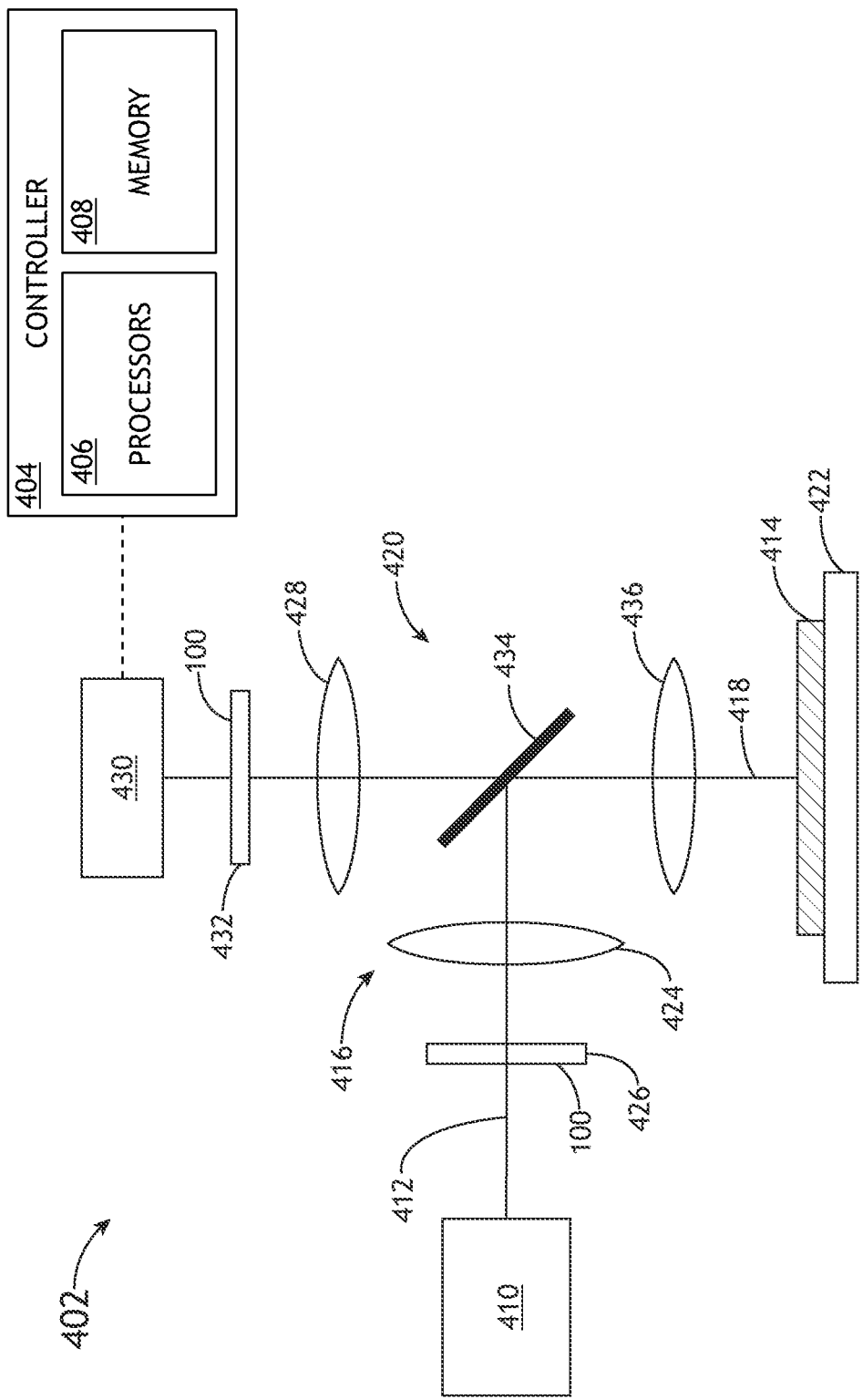
FIG. 4C is a conceptual view of a metrology tool configured with a common objective lens, in accordance with one or more embodiments of the present disclosure.
Figure 5:
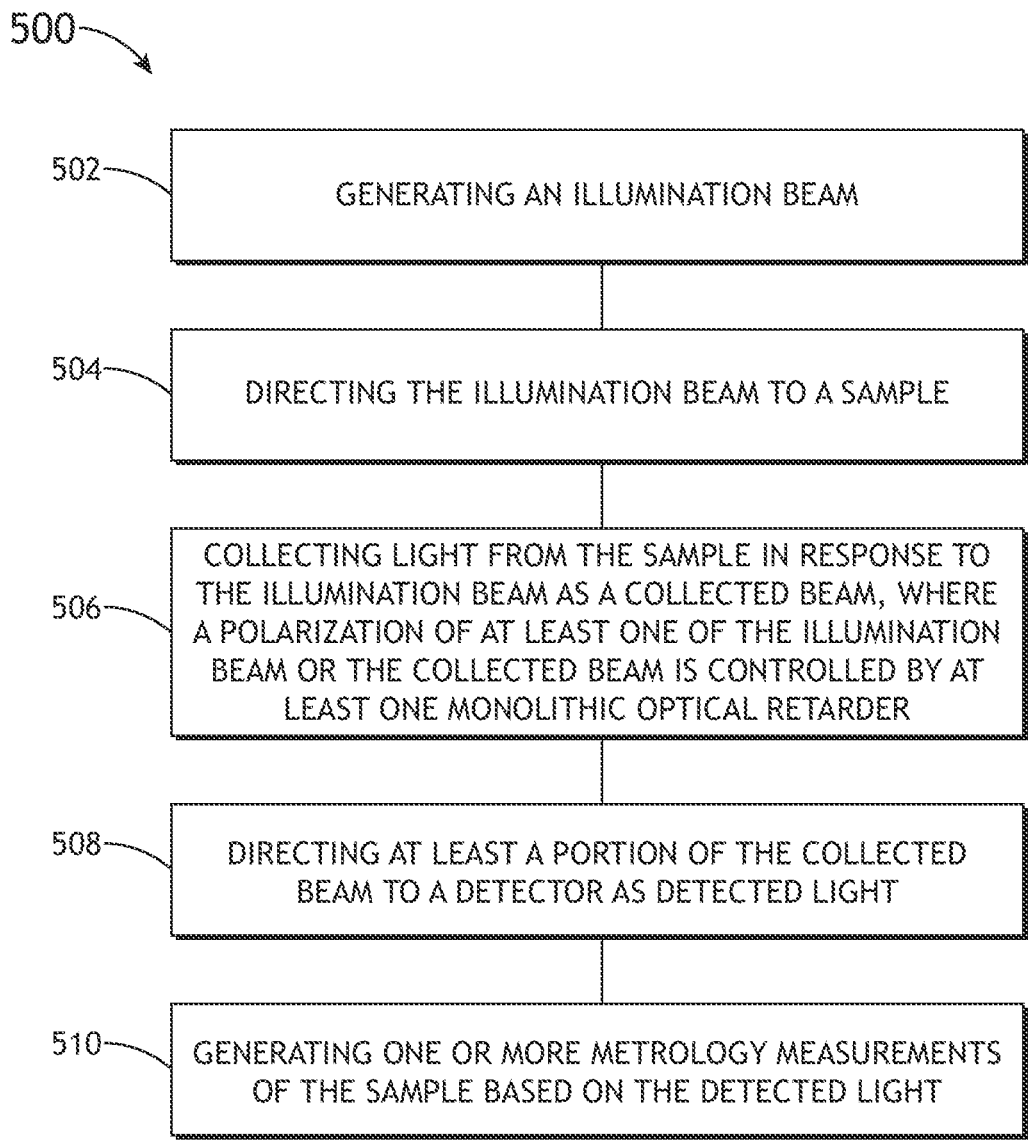
FIG. 5 is a flow diagram illustrating steps performed in a method for metrology using a monolithic optical retarder, in accordance with one or more embodiments of the present disclosure.

Referring now to FIGS. 4A-5, systems and methods for metrology with a monolithic optical retarder 100 are described in greater detail in accordance with one or more embodiments of the present disclosure. It is contemplated herein that a monolithic optical retarder 100 may be integrated within any type of metrology system known in the art requiring polarization control of a light beam 110.

FIG. 4A is a block diagram view of a metrology system 400 including a monolithic optical retarder 100, in accordance with one or more embodiments of the present disclosure.

In some embodiments, a metrology system 400 includes a metrology tool 402 for generating metrology data associated with one or more samples. The metrology tool 402 may include any type of metrology tool known in the art suitable for providing scatterometry metrology signals at one or more wavelengths. For example, the metrology tool 402 may include, but is not limited to, a spectrometer, a spectroscopic ellipsometer with one or more angles of illumination, a spectroscopic ellipsometer for measuring Mueller matrix elements (e.g., using rotating compensators), a spectroscopic reflectometer, a scatterometer, or a polarimeter. Further, the metrology tool 402 may operate in an imaging or a non-imaging configuration.

Further, the metrology tool 402 may include a single metrology tool or multiple metrology tools. For example, a metrology tool including multiple hardware configurations is generally described in U.S. Pat. No. 7,933,026, which is incorporated herein by reference in its entirety. A metrology system incorporating multiple metrology tools is generally described in U.S. Pat. No. 7,478,019, which is incorporated herein by reference in its entirety. Focused beam ellipsometry based on primarily reflective optics is generally described in U.S. Pat. No. 5,608,526, which is incorporated herein by reference in its entirety. The use of apodizers to mitigate the effects of optical diffraction causing the spread of the illumination spot beyond the size defined by geometric optics is generally described in U.S. Pat. No. 5,859,424, which is incorporated herein by reference in its entirety. The use of high-numerical-aperture tools with simultaneous multiple angle-of-incidence illumination is generally described in U.S. Pat. No. 6,429,943, which is incorporated herein by reference in its entirety.

The metrology tool 402 may generate metrology data associated with any location on a sample. In some embodiments, the metrology tool 402 generates metrology data for device features on a sample. In this regard, the metrology tool 402 may directly characterize features of interest. In some embodiments, the metrology tool 402 generates metrology data for one or more metrology targets (e.g., targets) including fabricated features designed to be representative of the device features on the sample. In this regard, measurements of one or more metrology targets distributed across a sample may be attributed to the device features. For example, it may be the case that the size, shape, or distribution of sample features may not be suitable for accurate metrology measurements. In contrast, a metrology target may include features on one or more sample layers having sizes, shapes, and distributions tailored such that metrology data of the target is highly sensitive to one or more selected physical or optical attributes of the features. Metrology data of the target may then be related to specific values of the selected attributes (e.g., through a model).

Metrology targets may be designed to be sensitive to, and thus facilitate measurements of, a wide variety of physical or optical attributes including, but not limited to CD, overlay, sidewall angles, film thicknesses, film compositions, or process-related parameters (e.g., focus, dose, and the like). To this end, a metrology target may include any combination of periodic structures (e.g., one, two or three-dimensional periodic structures) or isolated non-periodic features. The use of a metrology tool to characterize non-periodic features is generally described in U.S. Pat. No. 9,291,554, granted on Mar. 22, 2016, which is incorporated herein by reference in its entirety. Further, a metrology target may generally be characterized having one or more spatial frequencies (e.g., one or more pitches) that can be attributed to a pattern or distribution of features. The use of symmetric target design in scatterometry overlay metrology is generally described in U.S. Patent Publication No. 2015/0204664, published on Jul. 23, 2015, which is incorporated herein by reference in its entirety.

Metrology targets may be located at multiple sites on a sample. For example, targets may be located within scribe lines (e.g., between dies) and/or located in a die itself. Multiple targets may be measured simultaneously or serially by the same or multiple metrology tools as described in U.S. Pat. No. 7,478,019, which is incorporated herein by reference in its entirety.

In some embodiments, the metrology system 400 includes a controller 404. In some embodiments, the controller 404 includes one or more processors 406 configured to execute program instructions maintained on a memory medium 408 (e.g., memory). In this regard, the one or more processors 406 of controller 404 may execute any of the various process steps described throughout the present disclosure. Further, the memory medium 408 may store any type of data for use by any component of the metrology system 400. For example, the memory medium 408 may store recipes for the metrology tool 402, metrology data generated by the metrology tool 402, or the like.

The one or more processors 406 of a controller 404 may include any processing element known in the art. In this sense, the one or more processors 406 may include any microprocessor-type device configured to execute algorithms and/or instructions. In some embodiments, the one or more processors 406 may consist of a desktop computer, mainframe computer system, workstation, image computer, parallel processor, or any other computer system (e.g., networked computer) configured to execute a program configured to operate the metrology system 400, as described throughout the present disclosure. It is further recognized that the term "processor" may be broadly defined to encompass any device having one or more processing elements, which execute program instructions from a non-transitory memory medium 408.

The memory medium 408 may include any storage medium known in the art suitable for storing program instructions executable by the associated one or more processors 406. For example, the memory medium 408 may include a non-transitory memory medium. By way of another example, the memory medium 408 may include, but is not limited to, a read-only memory, a random-access memory, a magnetic or optical memory device (e.g., disk), a magnetic tape, a solid-state drive, and the like. It is further noted that memory medium 408 may be housed in a common controller housing with the one or more processors 406. In some embodiments, the memory medium 408 may be located remotely with respect to the physical location of the one or more processors 406 and controller 404. For instance, the one or more processors 406 of controller 404 may access a remote memory (e.g., server), accessible through a network (e.g., internet, intranet, and the like). Therefore, the above description should not be interpreted as a limitation on the present invention but merely an illustration.

Additionally, the controller 404 and any associated components (e.g., the processors 406, the memory medium 408, or the like) may include one or more controllers housed in a common housing or within multiple housings. Further, the controller 404 may be integrated with and/or perform the functions of any components in the metrology system 400.

The controller 404 may further perform any number of processing or analysis steps. For example, a metrology target may be modeled (parameterized) using any technique known in the art including, but not limited to, a geometric engine, a process modeling engine, or a combination thereof. The use of process modeling is generally described in U.S. Patent Publication No. 2014/0172394, which is incorporated herein by reference in its entirety. A geometric engine may be implemented, but is not required to be implemented, by AcuShape software, a product provided by KLA Corp. By way of another example, optical interaction of an illumination beam with a metrology target on a sample may, but is not limited to, be modeled using an electromagnetic (EM) solver. Further, the EM solver may utilize any method known in the art including, but not limited to, rigorous coupled-wave analysis (RCWA), finite element method analysis, method of moments analysis, a surface integral technique, a volume integral technique, or a finite-difference time-domain analysis.

The controller 404 may further analyze collected data from the metrology tool 402 using any data fitting and optimization technique known in the art to apply the collected data to the model including, but not limited to libraries, fast-reduced-order models, regression, machine-learning algorithms such as neural networks, support-vector machines (SVM), dimensionality-reduction algorithms (e.g. principal component analysis (PCA), independent component analysis (ICA), local-linear embedding (LLE), and the like), sparse representation of data (e.g., Fourier or wavelet transforms, Kalman filters, algorithms to promote matching from same or different tool types, and the like). For example, data collection and/or fitting may be, but is not required to be, performed by the Signal Response Metrology (SRM), a product provided by KLA Corp.

In some embodiments, the controller 404 analyzes raw data generated by the metrology tool 402 using algorithms that do not include modeling, optimization and/or fitting (e.g., phase characterization, or the like). It is noted herein that computational algorithms performed by the controller may be, but are not required to be, tailored for metrology applications through the use of parallelization, distributed computation, load-balancing, multi-service support, design and implementation of computational hardware, or dynamic load optimization. Further, various implementations of algorithms may be, but are not required to be, performed by the controller 404 (e.g., though firmware, software, or field-programmable gate arrays (FPGAs), and the like), or one or more programmable optical elements associated with the metrology tool 402.

FIG. 4B is a conceptual view of a metrology tool 402, in accordance with one or more embodiments of the present disclosure.

In some embodiments, the metrology tool 402 includes an illumination source 410 to generate an illumination beam 412. The illumination beam 412 may include one or more selected wavelengths of light including, but not limited to, ultraviolet (UV) radiation, visible radiation, or infrared (IR) radiation. For example, the metrology tool 402 may include an illumination source 410 suitable for generating an illumination beam 412 with wavelengths spanning a range of 120-20,000 nm or any subset or combination of subsets of wavelengths therein.

The metrology system 400 may include any number or type of illumination source 410 known in the art. In some embodiments, the illumination source 410 includes a laser source such as, but not limited to one or more narrowband laser sources, one or more broadband laser sources, one or more supercontinuum laser sources, one or more white light laser sources, one or more quantum cascade lasers (QCL), or the like. In some embodiments, the illumination source 410 includes one or more light emitting diodes (LEDs). In some embodiments, the illumination source 410 includes a lamp source such as, but not limited to, an arc lamp, a discharge lamp, an electrode-less lamp, and the like. For example, a lamp source, may include, but is not limited to, a Xe lamp source, a deuterium (D2) lamp source, or a halogen lamp source. In some embodiments, the illumination source 410 includes a broadband plasma (BBP) illumination source. In some embodiments, the illumination source 410 provides a tunable illumination beam 412. For example, the illumination source 410 may include a tunable source of illumination (e.g., one or more tunable lasers, or the like). By way of another example, the illumination source 410 may include a broadband illumination source coupled to a tunable filter. The illumination source 410 may further provide an illumination beam 412 having any temporal profile. For example, the illumination beam 412 may have a continuous temporal profile, a modulated temporal profile, a pulsed temporal profile, or the like.

In some embodiments, the illumination source 410 directs the illumination beam 412 to a sample 414 via an illumination pathway 416 and collects light emanating from the sample as a collected beam 418 (e.g., collected light) via a collection pathway 420. The collected beam 418 may include any combination of light from the sample 414 generated in response to the incident illumination beam 412 such as, but not limited to, reflected light, scattered light, diffracted light, or luminescence of the sample 414. In some embodiments, the sample 414 is located on a sample stage 422, which may include, but is not limited to, any combination of a linear translation stage, a rotational stage, or a tip/tilt stage.

In some embodiments, the illumination pathway 416 may include an illumination focusing element 424 to focus the illumination beam 412 onto the sample 414. The illumination pathway 416 may include one or more illumination beam conditioning components 426 suitable for modifying and/or conditioning the illumination beam 412. For example, the one or more illumination beam conditioning components 426 may include, but are not limited to, one or more polarizers, one or more filters, one or more beam splitters, one or more apodizers, one or more beam shapers, one or more diffusers, one or more homogenizers, or one or more lenses. In some embodiments, the one or more illumination beam conditioning components 426 in the illumination pathway 416 include at least one monolithic optical retarder 100 to provide polarization control of the illumination beam 412, which may operate as the light beam 110 illustrated in FIGS. 1-3B.

In some embodiments, the collection pathway 420 may include a collection focusing element 428 to capture the collected beam 418 from the sample 414. In some embodiments, the metrology system 400 includes a detector 430 configured to detect at least a portion of the collected beam 418 emanating from the sample 414 through the collection pathway 420. The detector 430 may include any type of optical detector known in the art suitable for measuring illumination received from the sample 414. For example, a detector 430 may include, but is not limited to, a CCD detector, a CMOS detector, a TDI detector, a photomultiplier tube (PMT), an avalanche photodiode (APD), and the like. In some embodiments, a detector 430 may include a spectroscopic detector suitable for identifying wavelengths of radiation emanating from the sample 414.

The collection pathway 420 may further include any number of collection beam conditioning elements 432 to direct and/or modify illumination collected by the collection focusing element 428 including, but not limited to one or more lenses, one or more filters, one or more polarizers, or one or more phase plates. In some embodiments, the one or more collection beam conditioning elements 432 in the collection pathway 420 include at least one monolithic optical retarder 100 to provide polarization control of the collected beam 418, which may operate as the light beam 110 illustrated in FIGS. 1-3B.

In some embodiments, the metrology tool 402 depicted in FIG. 4B may facilitate multi-angle illumination of the sample 414, and/or more than one illumination source 410 (e.g., coupled to one or more additional detectors 430). In this regard, the metrology tool 402 depicted in FIG. 4B may perform multiple metrology measurements. In some embodiments, the metrology tool 402 may include multiple detectors 430 to facilitate multiple metrology measurements (e.g., multiple metrology tools) by the metrology tool 402.

Further, the metrology tool 402 may facilitate multi-angle illumination of the sample 414, and/or more than one illumination source 410. In this regard, the metrology tool 402 may perform multiple metrology measurements. In some embodiments, one or more optical components may be mounted to a rotatable arm (not shown) pivoting around the sample 414 such that the angle of incidence of the illumination beam 412 on the sample 414 may be controlled by the position of the rotatable arm.

In some embodiments, one or more components are common to both the illumination pathway 416 and the collection pathway 420. FIG. 4C is a conceptual view of a metrology tool 402 configured with a common objective lens, in accordance with one or more embodiments of the present disclosure. In some embodiments, the metrology tool 402 includes a beamsplitter 434 oriented such that an objective lens 436 may simultaneously direct the illumination beam 412 to the sample 414 and capture the collected beam 418 emanating from the sample 414. In this regard, the objective lens 436 may operate in place of or along with the illumination focusing element 424 and/or the collection focusing element 428 of FIG. 4B.

Referring generally to FIGS. 4A through 4C, it is contemplated herein that a metrology tool 402 may include any number of monolithic optical retarders 100 in any configuration. For example, the metrology tool 402 may include one or more monolithic optical retarders 100 in an illumination pathway 416 and/or a collection pathway 420. A monolithic optical retarder 100 in either location may be placed in a finite or infinite conjugate space. For instance, a monolithic optical retarder may be located in, but is not limited to, a field plane or a pupil plane of the metrology tool 402.

Further, monolithic optical retarders 100 may be used in conjunction with additional components including, but not limited to, additional polarization-controlling components. Additionally, since a monolithic optical retarder 100 provides an undeviated optical path for light passing through it, a monolithic optical retarder 100 may be, but is not required to be, rotatable within a metrology tool 402. In this way, the impact of the monolithic optical retarder 100 on the polarization of light passing through it may be dynamically controlled through the rotation angle of the monolithic optical polarizer 100. In some embodiments, a metrology tool 402 includes at least one rotatable monolithic optical retarder 100. In some embodiments, a metrology tool 402 includes at least one rotatable monolithic optical retarder 100 and at least one polarizer, which may be fixed or rotatable. In some embodiments, a metrology tool 402 includes at least one fixed (e.g., non-rotatable) monolithic optical retarder 100 and at least one rotatable polarizer. It is to be understood, however, that the above examples are provided solely for illustrative purposes and should not be interpreted as limiting.

In some embodiments, a metrology tool 402 includes at least one monolithic optical retarder 100 in a fixed (e.g., non-rotating) configuration and a rotating polarizer. In some embodiments, In some embodiments, the controller 404 may be communicatively coupled to any component of the metrology system 400. In some embodiments, the controller 404 is communicatively coupled to the illumination source 410 to provide one or more selected wavelengths of illumination for scatterometry measurements. In some embodiments, the controller 404 is coupled to one or more elements of the illumination pathway 416 to direct the adjustment of the angle of incidence between the illumination beam 412 and the sample 414.

FIG. 5 is a flow diagram illustrating steps performed in a method 500 for metrology using a monolithic optical retarder, in accordance with one or more embodiments of the present disclosure. Applicant notes that the embodiments and enabling technologies described previously herein in the context of the metrology system 400 should be interpreted to extend to the method 500. It is further noted, however, that the method 500 is not limited to the architecture of the metrology system 400.

In some embodiments, the method 500 includes a step 502 of generating an illumination beam 412. For example, the illumination beam 412 may be, but is not required to be, generated by an illumination source 410 as described with respect to FIGS. 4A-4C. In some embodiments, the method 500 includes a step 504 of directing the illumination beam 412 to a sample 414. In some embodiments, the method 500 includes a step 506 of collecting light from the sample 414 (e.g., a collected beam 418) in response to the illumination beam as a collected beam, where a polarization of at least the illumination beam or the collected beam is controlled by at least one monolithic optical retarder 100 as disclosed herein. In this way, the monolithic optical retarder 100 may operate on a light beam 110 including the illumination beam 412 for a monolithic optical retarder 100 located in an illumination pathway 416 and/or the collected beam 418 for a monolithic optical retarder 100 located in a collection pathway 420.

For example, the monolithic optical retarder 100 may include an input face 104 for receiving a light beam 110 (e.g., the illumination beam 412 or the collected beam 418), an output face 108 aligned with an optical axis 212 of the light beam 110 prior to entering the input face 104, and three or more reflection faces 106. In this way, the three or more reflection faces 106 may be oriented to provide an optical path for the light beam 110 from the input face 104 to the output face 108 via reflection by the three or more reflection faces 106. Further, the input face 104, the output face 108, and the three or more reflection faces 106 may be oriented to provide that an optical axis 212 of the light beam exiting the output face 108 is equal to the optical axis 212 of the light beam entering the input face 104, wherein the monolithic prism 102 imparts a selected optical retardation on the light beam 110 upon propagation along the optical path based on total internal reflection on at least one of the three or more reflection faces 106.

In some embodiments, the method 500 includes a step 508 of directing at least a portion of the collected beam to a detector as detected light. In some embodiments, the method 500 includes a step 510 of generating one or more metrology measurements of the sample 414 based on the detected light. For example, the metrology measurements may include, but are not limited to, spectroscopic measurements, ellipsometric measurements, or polarimetric measurements. Further the metrology measurements may characterize any aspect of the sample 414 including, but not limited to, material properties of one or more films thereon, dimensional measurements of fabricated structures, positional measurements of fabricated structures, or the identification of defects on the sample 414.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A monolithic optical retarder comprising:
a monolithic prism comprising:
an input face for receiving a light beam;
an output face aligned with an optical axis of the light beam prior to entering the input face; and
three or more reflection faces, wherein the three or more reflection faces are oriented to provide an optical path for the light beam from the input face to the output face via reflection by the three or more reflection faces, wherein the monolithic optical retarder imparts a total optical retardation on the light beam upon propagation along the optical path based on total internal reflection on at least one of the three or more reflection faces, wherein the input face, the output face, and the three or more reflection faces are oriented to provide that an optical axis of the light beam exiting the output face is aligned with the optical axis of the light beam entering the input face, wherein the three or more reflection faces comprise one or more retarding faces, wherein incident angles of the light beam on the one or more retarding faces are greater than a critical angle for total internal reflection, wherein the total optical retardation on the light beam upon propagation along the optical path corresponds to cumulative optical retardations on the light beam imparted by the one or more retarding faces.

2. The monolithic optical retarder of claim 1, wherein the incident angles of the light beam on the one or more retarding faces are greater than the critical angle for total internal reflection for wavelengths in at least one of an ultraviolet spectral region, a vacuum ultraviolet spectral region, or a deep ultraviolet spectral region.

3. The monolithic optical retarder of claim 1, wherein the incident angles of the light beam on the one or more retarding faces are greater than the critical angle for total internal reflection for wavelengths including a visible spectral region.

4. The monolithic optical retarder of claim 1, wherein the incident angles of the light beam on the one or more retarding faces are greater than the critical angle for total internal reflection for wavelengths including an infrared spectral region.

5. The monolithic optical retarder of claim 1, wherein the incident angles of the light beam on the one or more retarding faces are greater than the critical angle for total internal reflection for wavelengths in a range from 120 nanometers to 20,000 nanometers.

6. The monolithic optical retarder of claim 1, wherein the incident angles of the light beam on the one or more retarding faces are greater than the critical angle for total internal reflection for wavelengths in a range from 120 nanometers to 7000 nanometers.

7. The monolithic optical retarder of claim 1, wherein the incident angles of the light beam on the one or more retarding faces are greater than the critical angle for total internal reflection for wavelengths in a range from 170 nanometers to 2500 nanometers.

8. The monolithic optical retarder of claim 1, wherein an optical retardation of at least one of the one or more retarding faces is in a range of 20 degrees to 80 degrees.

9. The monolithic optical retarder of claim 1, wherein the total optical retardation is in a range of 60 degrees to 120 degrees.

10. The monolithic optical retarder of claim 1, wherein the total optical retardation is 90 degrees.

11. The monolithic optical retarder of claim 1, wherein the total optical retardation is 180 degrees.

12. The monolithic optical retarder of claim 1, wherein the three or more reflection faces comprise:
a first reflective face oriented to receive the light from the input face, wherein the first reflective face is oriented at a selected angle relative to the input face;
a second reflective face oriented to receive the light from the first reflective face, wherein the second reflective face is orthogonal to the input face; and
a third reflective face oriented to receive the light from the second reflective face, wherein the third reflective face is oriented at the selected angle relative to the output face.

13. The monolithic optical retarder of claim 12, wherein the selected angle is greater than a critical angle for total internal reflection.

14. The monolithic optical retarder of claim 1, wherein the three or more reflection faces comprises:
a first reflective face oriented to receive the light from the input face;
a second reflective face oriented to receive the light from the first reflective face, wherein the second reflective face is parallel to the first reflective face;
a third reflective face oriented to receive the light from the second reflective face; and
a fourth reflective face oriented to receive the light from the third reflective face, wherein the fourth reflective face is parallel to the third reflective face.

15. The monolithic optical retarder of claim 1, wherein the monolithic prism comprises:
a monolithic k-prism.

16. The monolithic optical retarder of claim 1, wherein the monolithic prism comprises:
a monolithic Fresnel rhomb retarder.

17. The monolithic optical retarder of claim 1, wherein the monolithic prism comprises:
a glass.

18. The monolithic optical retarder of claim 1, wherein the monolithic prism comprises:
at least one of fused silica, quartz, sapphire, calcium fluoride, magnesium fluoride, BK7, zinc sulfide, or zinc selenide.

19. The monolithic optical retarder of claim 1, wherein the input face, the output face, and the three or more reflective faces are polished faces.

20. The monolithic optical retarder of claim 1, wherein the monolithic prism is rotatable around the optical axis of the light beam entering the input face to provide polarization adjustment to the light beam without deviating the light beam.

21. A metrology system comprising:
    an illumination source to generate an illumination beam;
    one or more illumination optics to direct the illumination beam to a sample;
    a detector;
    one or more collection optics to collect light from the sample as a collected beam and direct at least a portion of the collected beam to the detector as detected light,
    one or more monolithic optical retarders associated with at least one of the one or more illumination optics or the one or more collection optics, wherein a particular monolithic optical retarder of the one or more monolithic optical retarders comprises:
        a monolithic prism comprising:
            an input face for receiving a light beam;
            an output face aligned with an optical axis of the light beam prior to entering the input face; and
            three or more reflection faces, wherein the three or more reflection faces are oriented to provide an optical path for the light beam from the input face to the output face via total internal reflection by the three or more reflection faces, wherein the monolithic optical retarder imparts a selected optical retardation on the light beam upon propagation along the optical path based on total internal reflection on the three or more reflection faces, wherein the input face, the output face, and the three or more reflection faces are oriented to provide that an optical axis of the light beam exiting the output face is equal to the optical axis of the light beam entering the input face, wherein the three or more reflection faces comprise one or more retarding faces, wherein incident angles of the light beam on the one or more retarding faces are greater than a critical angle for total internal reflection, wherein the total optical retardation on the light beam upon propagation along the optical path corresponds to cumulative optical retardations on the light beam imparted by the one or more retarding faces; and
    a controller communicatively coupled to the detector, wherein the controller includes one or more processors configured to execute program instructions causing the one or more processors to generate one or more metrology measurements of the sample based on the detected light.

22. The metrology system of claim 21, wherein at least one of the one or more monolithic optical retarders is rotatable along the optical axis of the respective light beam to provide polarization adjustments to the respective light beam without deviating the respective light beam.

23. The metrology system of claim 21, wherein at least one of the one or more monolithic optical retarders comprises:
    one of the one or more illumination optics, wherein the at least one of the one or more monolithic optical retarders receives the illumination beam as the light beam.

24. The metrology system of claim 21, wherein at least one of the one or more monolithic optical retarders comprises:
    one of the one or more collection optics, wherein the at least one of the one or more monolithic optical retarders receives the collected beam as the light beam.

25. The metrology system of claim 21, wherein the metrology system comprises:
    a broadband metrology tool.

26. The metrology system of claim 21, wherein the metrology system comprises:
    at least one of an ellipsometer, a reflectometer, a scatterometer, or a polarimeter.

27. The metrology system of claim 21, wherein the three or more reflection faces comprises:
    a first reflective face oriented to receive the light from the input face, wherein the first reflective face is oriented at a selected angle relative to the input face;
    a second reflective face oriented to receive the light from the first reflective face, wherein the second reflective face is orthogonal to the input face; and
    a third reflective face oriented to receive the light from the second reflective face, wherein the third reflective face is oriented at a selected angle relative to the output face.

28. The metrology system of claim 21, wherein the three or more reflection faces comprises:
    a first reflective face oriented to receive the light from the input face;
    a second reflective face oriented to receive the light from the first reflective face, wherein the second reflective face is parallel to the first reflective face;
    a third reflective face oriented to receive the light from the second reflective face; and
    a fourth reflective face oriented to receive the light from the third reflective face, wherein the fourth reflective face is parallel to the third reflective face.

29. The metrology system of claim 21, wherein the monolithic solid material comprises:
    a monolithic k-prism.

30. The metrology system of claim 21, wherein the monolithic solid material comprises:
    a monolithic Fresnel rhomb retarder.

31. The metrology system of claim 21, wherein the monolithic solid material comprises:
    a glass.

32. A metrology method comprising:
    generating an illumination beam;
    directing the illumination beam to a sample;
    collecting light from the sample in response to the illumination beam as a collected beam, wherein a polarization of at least the illumination beam or the collected beam is controlled by at least one monolithic optical retarder formed from a monolithic prism comprising:
        an input face for receiving a light beam;
        an output face aligned with an optical axis of the light beam prior to entering the input face; and
        three or more reflection faces, wherein the three or more reflection faces are oriented to provide an optical path for the light beam from the input face to the output face via reflection by the three or more reflection faces, wherein the monolithic optical retarder imparts a selected optical retardation on the light beam upon propagation along the optical path based on total internal reflection on at least one of the three or more reflection faces, wherein the input face, the output face, and the three or more reflection faces are oriented to provide that an optical axis of the light beam exiting the output face is equal to the optical axis of the light beam entering the input face, wherein the three or more reflection faces comprise one or more retarding faces, wherein incident angles of the light beam on the one or more retarding faces are greater than a critical angle for total internal reflection, wherein the total optical retardation on the light beam upon propagation along the optical path corresponds to cumulative optical retardations on the light beam imparted by the one or more retarding faces;

directing at least a portion of the collected beam to a detector as detected light; and generating one or more metrology measurements of the sample based on the detected light.

33. The metrology method of claim 32, wherein the three or more reflection faces comprises:
a first reflective face oriented to receive the light from the input face, wherein the first reflective face is oriented at a selected angle relative to the input face;
a second reflective face oriented to receive the light from the first reflective face, wherein the second reflective face is orthogonal to the input face; and
a third reflective face oriented to receive the light from the second reflective face, wherein the third reflective face is oriented at a selected angle relative to the output face.

34. The metrology method of claim 32, wherein the three or more reflection faces comprises:
a first reflective face oriented to receive the light from the input face;
a second reflective face oriented to receive the light from the first reflective face, wherein the second reflective face is parallel to the first reflective face;
a third reflective face oriented to receive the light from the second reflective face; and
a fourth reflective face oriented to receive the light from the third reflective face, wherein the fourth reflective face is parallel to the third reflective face.

35. The metrology method of claim 32, wherein at least one of the one or more metrology measurements comprises:
at least one of an ellipsometry measurement, a reflectometry measurement, a scatterometry measurement, or a polarimetry measurement.

36. A monolithic optical retarder comprising:
a monolithic prism comprising:
an input face for receiving a light beam;
an output face aligned with an optical axis of the light beam prior to entering the input face; and
three or more reflection faces, wherein the three or more reflection faces are oriented to provide an optical path for the light beam from the input face to the output face via reflection by the three or more reflection faces, wherein the monolithic optical retarder imparts a total optical retardation on the light beam upon propagation along the optical path based on total internal reflection on at least one of the three or more reflection faces, wherein the input face, the output face, and the three or more reflection faces are oriented to provide that an optical axis of the light beam exiting the output face is aligned with the optical axis of the light beam entering the input face, wherein the three or more reflection faces include one or more non-retarding faces, wherein incident angles of the light beam on the one or more non-retarding faces are lower than a critical angle for total internal reflection, wherein the one or more non-retarding faces impart zero optical retardation on the light beam.

37. A metrology system comprising:
an illumination source to generate an illumination beam;
one or more illumination optics to direct the illumination beam to a sample;
a detector;
one or more collection optics to collect light from the sample as a collected beam and direct at least a portion of the collected beam to the detector as detected light,
one or more monolithic optical retarders associated with at least one of the one or more illumination optics or the one or more collection optics, wherein a particular monolithic optical retarder of the one or more monolithic optical retarders comprises:
a monolithic prism comprising:
an input face for receiving a light beam;
an output face aligned with an optical axis of the light beam prior to entering the input face; and
three or more reflection faces, wherein the three or more reflection faces are oriented to provide an optical path for the light beam from the input face to the output face via total internal reflection by the three or more reflection faces, wherein the monolithic optical retarder imparts a selected optical retardation on the light beam upon propagation along the optical path based on total internal reflection on the three or more reflection faces, wherein the input face, the output face, and the three or more reflection faces are oriented to provide that an optical axis of the light beam exiting the output face is equal to the optical axis of the light beam entering the input face, wherein the three or more reflection faces include one or more non-retarding faces, wherein incident angles of the light beam on the one or more non-retarding faces are lower than a critical angle for total internal reflection, wherein the one or more non-retarding faces impart zero optical retardation on the light beam; and
a controller communicatively coupled to the detector, wherein the controller includes one or more processors configured to execute program instructions causing the one or more processors to generate one or more metrology measurements of the sample based on the detected light.

38. A metrology method comprising:
generating an illumination beam;
directing the illumination beam to a sample;
collecting light from the sample in response to the illumination beam as a collected beam, wherein a polarization of at least the illumination beam or the collected beam is controlled by at least one monolithic optical retarder formed from a monolithic prism comprising:
an input face for receiving a light beam;
an output face aligned with an optical axis of the light beam prior to entering the input face; and
three or more reflection faces, wherein the three or more reflection faces are oriented to provide an optical path for the light beam from the input face to the output face via reflection by the three or more reflection faces, wherein the monolithic optical retarder imparts a selected optical retardation on the light beam upon propagation along the optical path based on total internal reflection on at least one of the three or more reflection faces, wherein the input face, the output face, and the three or more reflection faces are oriented to provide that an optical axis of the light beam exiting the output face is equal to the optical axis of the light beam entering the input face, wherein the three or more reflection faces include one or more non-retarding faces, wherein incident angles of the light beam on the one or more non-retarding faces are lower than a critical angle for total internal reflection, wherein the one or more non-retarding faces impart zero optical retardation on the light beam;

directing at least a portion of the collected beam to a detector as detected light; and generating one or more metrology measurements of the sample based on the detected light.

\* \* \* \* \*